US012060745B2

(12) United States Patent
Earl

(10) Patent No.: US 12,060,745 B2
(45) Date of Patent: Aug. 13, 2024

(54) GATE WHEEL

(71) Applicant: WARWICK GATES PTY LTD., Warwick (AU)

(72) Inventor: Jonathan Phillip Earl, Warwick (AU)

(73) Assignee: WARWICK GATES PTY LTD., Warwick (AU)

( * ) Notice: Subject to any disclaimer, the term of this patent is extended or adjusted under 35 U.S.C. 154(b) by 0 days.

(21) Appl. No.: 18/039,773

(22) PCT Filed: Nov. 29, 2021

(86) PCT No.: PCT/AU2021/051421
§ 371 (c)(1),
(2) Date: Jun. 1, 2023

(87) PCT Pub. No.: WO2022/115900
PCT Pub. Date: Jun. 9, 2022

(65) Prior Publication Data
US 2023/0349233 A1    Nov. 2, 2023

(30) Foreign Application Priority Data

Dec. 1, 2020 (AU) ............................... 2020904454

(51) Int. Cl.
*E06B 11/04* (2006.01)
*B60B 3/08* (2006.01)
*E05F 7/06* (2006.01)
*E06B 11/02* (2006.01)

(52) U.S. Cl.
CPC .............. *E06B 11/04* (2013.01); *B60B 3/087* (2013.01); *E05F 7/06* (2013.01); *E06B 11/022* (2013.01)

(58) Field of Classification Search
CPC ......... E06B 11/04; E06B 11/022; B60B 3/087
See application file for complete search history.

(56) References Cited

U.S. PATENT DOCUMENTS

| 93,027 | A | | 7/1869 | Wilde |
| 355,028 | A | | 1/1886 | Giles |
| 498,124 | A | | 5/1893 | Keith |
| 572,228 | A | | 12/1896 | Swink |
| 603,212 | A | | 4/1898 | Stevens |
| 683,694 | A | | 10/1901 | Livingstone |
| 1,340,961 | A | * | 5/1920 | Lachman ................. B60B 1/12 |
| | | | | 301/64.303 |

(Continued)

OTHER PUBLICATIONS

Front Gate—Adding Stability and a Wheel, https://www.youtube.com/watch v=KRBrHxtgJ3U1ist=RDCMUC8GJap7-XxlrSQqByPQGOSQ, Published Dec. 17, 2019.

(Continued)

*Primary Examiner* — Christine M Mills
*Assistant Examiner* — Matthew J Sullivan
(74) *Attorney, Agent, or Firm* — Ware, Fressola, Magure & Barber LLP

(57) ABSTRACT

A two-part gate wheel is disclosed. The gate wheel includes two hub portions, each of which extends through over 180°, and which has a slot which passes from the periphery through to the centre. In use, each hub portion can be introduced from opposed sides of a gate, and coupled together to form a wheel. In this way the wheel can be retro-fitted onto a gate.

20 Claims, 2 Drawing Sheets

(56) References Cited

U.S. PATENT DOCUMENTS

| | | | | |
|---|---|---|---|---|
| 1,393,795 | A | * | 10/1921 | Lachman .................. B60B 3/08 29/894.342 |
| 1,409,468 | A | | 3/1922 | Reading |
| 1,567,932 | A | | 12/1925 | Eschenbacher |
| 2,665,508 | A | | 1/1954 | Swanson |
| 3,317,246 | A | * | 5/1967 | Wester ...................... B62J 6/20 40/589 |
| 3,533,189 | A | | 10/1970 | Appell et al. |
| 3,602,550 | A | * | 8/1971 | Patane ...................... B62J 6/20 301/37.104 |
| 4,441,762 | A | * | 4/1984 | Segal ........................ B60B 7/04 301/37.108 |
| 5,003,840 | A | * | 4/1991 | Hinschlager ............. B62J 23/00 74/609 |
| 7,021,005 | B1 | | 4/2006 | Curry |
| 9,573,415 | B2 | * | 2/2017 | Werner ................. B60B 25/002 |
| 10,526,843 | B2 | * | 1/2020 | Maddamma .......... E06B 11/022 |
| 11,008,808 | B1 | * | 5/2021 | Constable ............. E06B 11/022 |
| 11,040,570 | B2 | * | 6/2021 | Edin ........................ B60B 3/14 |
| 11,400,752 | B2 | * | 8/2022 | Van Houten .......... B60B 7/0046 |
| 11,679,825 | B2 | * | 6/2023 | Suanno .................. B60B 3/087 305/136 |
| 11,753,867 | B1 | * | 9/2023 | Flannery ............... E06B 11/022 49/169 |
| 2014/0158601 | A1 | * | 6/2014 | Jones .................. B01D 33/333 210/232 |
| 2020/0031163 | A1 | * | 1/2020 | Waldner ................. B60B 19/00 |
| 2020/0040600 | A1 | * | 2/2020 | Mollhagen ............. E04H 17/18 |
| 2023/0166560 | A1 | * | 6/2023 | Schroeder ............. B60B 19/12 16/29 |

OTHER PUBLICATIONS

International-Type Search report, Australian Patent Application No. 2020904454, Aug. 18, 2021.

International Search Report and Written Opinion, PCT/AU2021/051421, Dec. 17, 2021.

\* cited by examiner

GATE WHEEL

FIELD OF THE INVENTION

The present invention relates to gates, such as those formed from a tubular frame. Such gates may have tubular rails or a mesh infill.

BACKGROUND TO THE INVENTION

Gates, such as those used to provide access into a farm field, are typically hinged at one end, an inner end, and are arranged to swing open and closed about a hinge axis.

Where the gates are relatively wide or heavy, or where the post to which they are hinged is not rigidly held in a vertical configuration, there can be a propensity for the gate to droop and for an outer edge of the gate to be dragged along the ground. This can make the gate difficult to open and close.

One way of avoiding such situations is to provide a gate wheel near the outer edge. A gate wheel is typically a wheel fixed to a tubular axle, the tubular axle being arranged to locate about a lower frame of the gate and arranged to rotate around the gate frame.

Gate wheels must be located in position on the frame during construction of the gate. As a consequence, gates having gate wheels are no longer flat, and are more difficult to stack, to store, and to transport than gates without wheels.

It is possible to retro-fit a gate wheel by cutting the gate frame, inserting the gate wheel, and then welding or otherwise reconnecting the gate frame. This is a difficult and laborious process, especially if attempted on a gate in situ.

The present invention seeks to address these concerns by providing a gate wheel arranged for installation onto a frame without requiring the frame to be cut.

SUMMARY OF THE INVENTION

According to one aspect of the present invention there is provided a gate wheel having at least two hub portions, each hub portion being connected to a rim portion, at least one hub portion including an opening, the opening extending from a centre of curvature of the rim portion to an outer periphery of the hub portion.

The rim portion preferably extends through 180°.

The hub portion preferably extends through an arc greater than 180°.

It is preferred that the gate wheel has two identical hub portions.

The gate wheel may include a tubular axle formed in two axle portions. Each axle portion may have a radial extension arranged, in use, to locate against a hub portion and be fixed to the hub portion.

In a preferred embodiment each radial extension includes at least one primary fixing means arranged to fix the radial extension to both hub portions. The gate wheel may include secondary fixing means arranged to connect one hub portion to another hub portion such that the respective rim portions combine to form a substantially complete wheel rim.

The tubular axle is preferably arranged to rotate about a gate frame.

In accordance with a second aspect of the present invention there is provided a method of attaching a gate wheel to a gate frame, the gate frame defining a gate, the method including the steps of:

(a) locating an upper axle portion about the gate frame;
(b) locating a lower axle portion about the gate frame;
(c) inserting a first hub portion from a first side of the gate; the first hub portion having an opening within which the gate frame can be received; the first hub portion having a first rim portion;
(d) inserting a second hub portion from a second side of the gate; the second hub portion having an opening within which the gate frame can be received; the second hub portion having a second rim portion;
(e) fixing the first hub portion to the second hub portion such that the first and second rim portions combine to form a substantially complete wheel rim;
(f) fixing a radial extension of the upper axle portion to the first and second hub portions; and
(g) fixing a radial extension of the lower axle portion to the first and second hub portions, such that the relative position of the upper and lower axle portions are fixed and the upper and lower axle portions create an axle arranged to rotate about the gate frame.

BRIEF DESCRIPTION OF THE DRAWINGS

It will be convenient to further describe the invention with reference to preferred embodiments of the present invention. Other embodiments are possible, and consequently the particularity of the following discussion is not to be understood as superseding the generality of the preceding description of the invention. In the drawings.

DETAILED DESCRIPTION OF PREFERRED EMBODIMENTS

Figure 1:
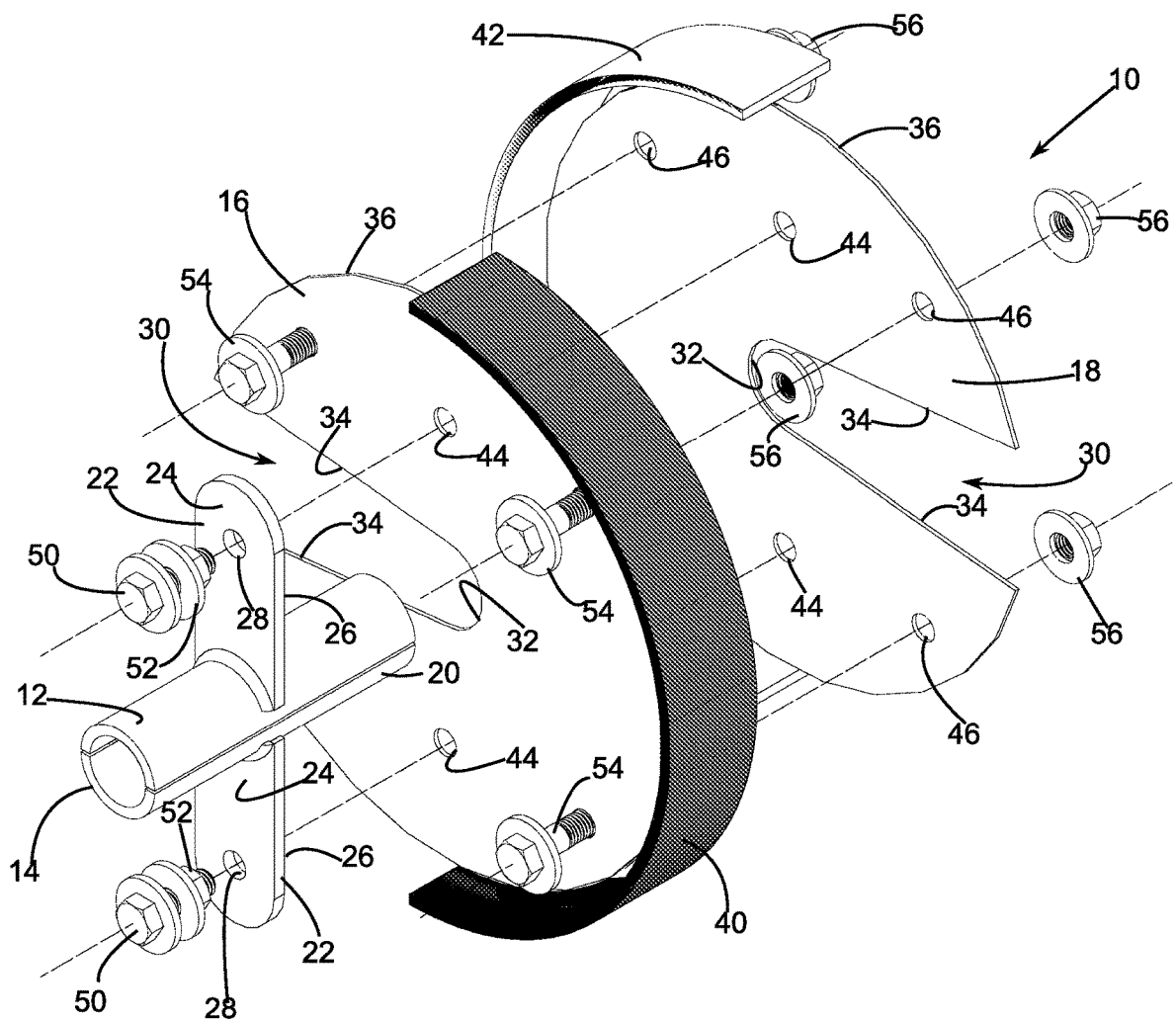
FIG. 1 is an exploded view of a gate wheel in accordance with the present invention.
Figure 2:
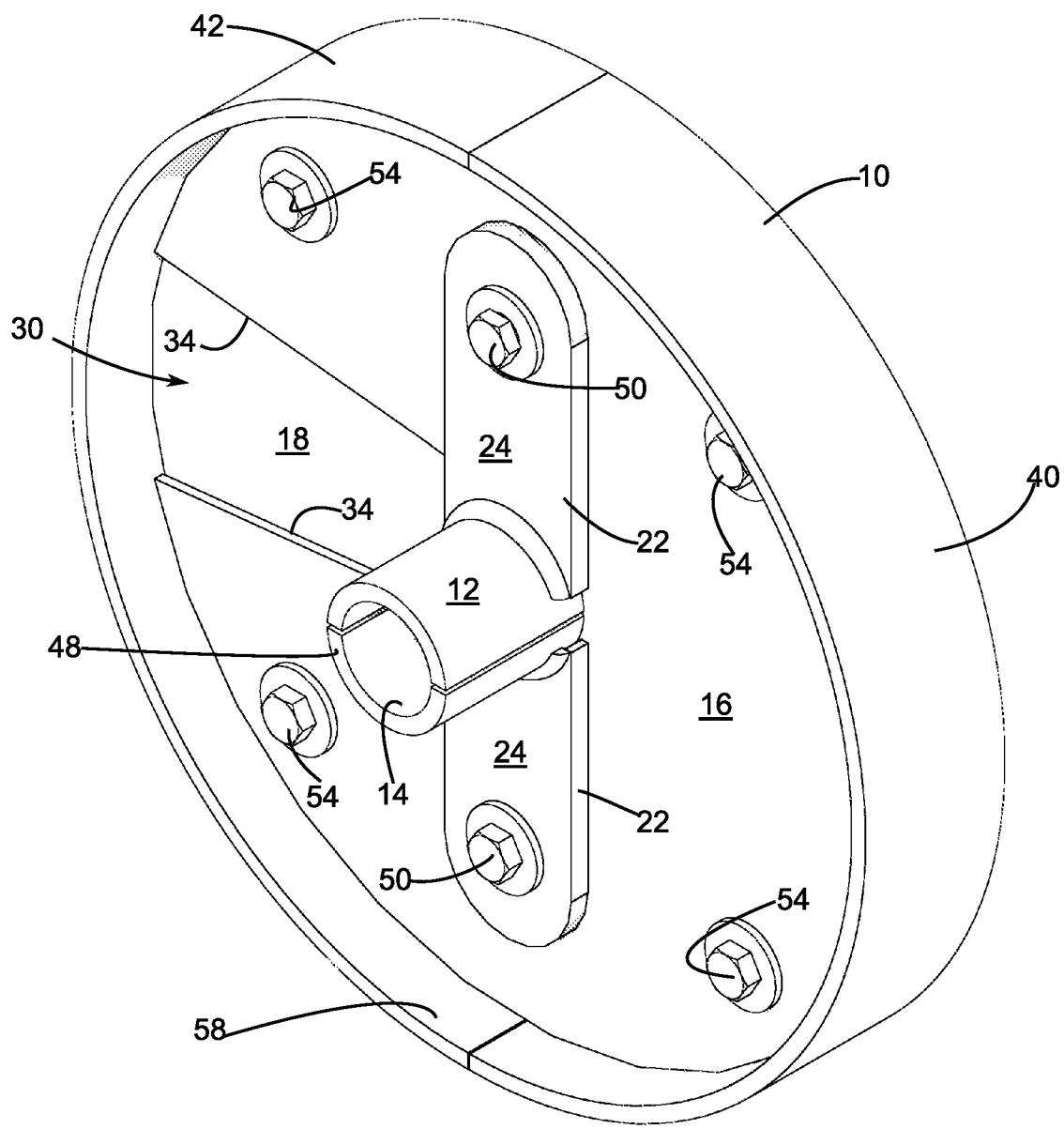
FIG. 2 is an assembled view of the gate wheel of FIG. 1.

Referring to the Figures, a gate wheel 10 is formed from a first hub portion 16 and a second hub portion 18. The gate wheel 10 is supported by an axle formed by an upper axle portion 12 and a lower axle portion 14.

Each of the upper axle portion 12 and the lower axle portion 14 is formed from a tube portion 20 which is semi-circular in cross section, along with a radial extension 22. The tube portions 20 combine to form a cylinder having a diameter slightly greater than that of a gate frame to which the gate wheel is to be attached.

Each radial extension 22 is formed from a sheet material, such as sheet metal. It is located about midway along its associated tube portion 20, and extends away from a convex side of the tube portion 20. Each radial extension 22 has a planar outer face 24 and a planar inner face 26, the outer face 24 and inner face 26 each facing in an axial direction. Each radial extension 22 has a bolt receiving aperture 28 located near an outer radial end thereof, the bolt receiving aperture 28 passing between the outer face 24 and the inner face 26.

Each of the first hub portion 16 and the second hub portion 18 is formed from a sheet material cut in a generally circular shape. An opening 30 extends generally radially through each hub portion 16, 18.

The opening 30 has a near semi-circular internal end 32. The internal end has a centre of curvature at a centre of the hub portion 16, 18, and a radius of curvature equal to that of the tube portions 20 of the axle portions 12, 14.

The opening 30 has generally radially extending sides 34 extending from the internal end 32 to a circumference of the hub portion 16, 18. In the embodiment of the drawing the radially extending sides 34 are slightly outwardly tapered at a relative angle of about 20°. The arrangement is such that the internal end 32 curves through about 160°, with the radially extending sides 34 extending away from each endpoint of the internal end 32 in a tangential direction.

Each hub portion 16, 18 thus has an outer periphery 36 which extends through about 330°.

The first hub portion 16 has a first rim portion 40 fixed to its outer periphery 36. The first rim portion 40 extends through 180°, and is parallel to the internal end 32 of the opening 30; that is, is on the opposite side of the first hub portion 16 to the opening 30.

The first rim portion 40 is formed as a semi-circular flange, extending axially on each side of the first hub portion 16.

The second hub portion 18 has a similar second rim portion 42.

Each of the first hub portion 16 and the second hub portion 18 has two primary apertures 44. The primary apertures 44 are located on a diameter of the first hub portion 16 which extends between ends of the first rim portion 40; that is, is perpendicular to a centre-line of the opening 30.

The primary apertures 44 are spaced such that when the upper axle portion 12 and the lower axle portion 14 are both located with their tube portions 20 within the internal end 32 of the opening 30, the primary apertures 44 align with the respective bolt receiving apertures 28 of the axle portions 12, 14.

Each of the first hub portion 16 and the second hub portion 18 has four secondary apertures 46. The secondary apertures 46 are located on either side of the primary apertures 44, towards the outer periphery 36.

In order to assemble the gate wheel 10, the upper axle portion 12 is lowered onto a frame of a gate, and the lower axle portion 14 brought to meet it, such that the tube portions 20 form an axle 48 which can rotate about the frame.

The first hub portion 16 is slid in a radial direction from a first side of the gate with the tube portions 20 (and thus the gate frame) passing through the opening 30 until they locate within the internal end 32.

The second hub portion 18 is oriented in an opposite direction to the first hub portion 16, and slid in a radial direction from a second side of the gate immediately behind the first hub portion 16. It will be appreciated that a rear face of the first hub portion 16 now abuts a front face of the second hub portion 18. A front face of the first hub portion 16 abuts the inner face 26 of the radial extensions 22 of the axle portions 12, 14. The primary apertures 44 of the hub portions 16, 18 align with each other and with the bolt receiving apertures 28 of the axle portions 12, 14. The secondary apertures 46 of the first hub portion 16 align with those of the second hub portion 18.

Primary bolts 50 can then be introduced into the bolt receiving apertures 28 of the axle portions 12, 14 of the hub portions 16, 18 and the primary apertures 44 of the hub portions 16, 18. The primary bolts 50 can be fixed with primary nuts 52 (shown in FIG. 1 located onto primary bolts 50 for simplicity).

Secondary bolts 54 can be introduced into the aligned secondary apertures 46 and secured with secondary nuts 56.

It will be appreciated that outer edges of the first rim portion 40 abut outer edges of the second rim portion 42, and thus the first and second rim portions 40, 42 combine to form a complete wheel rim 58 which is arranged to rotate with the axle 48 about the gate frame.

Modifications and variations as would be apparent to a skilled addressee are deemed to be within the scope of the present invention. For instance, it will be appreciated that some form of axle portion 12, 14 could be integrally formed with the hub portions 16, 18. Indeed, it will be appreciated that by using significantly thicker hub portions 16, 18 there may be no need for an additional axle portion at all. Similarly, although the rim portions 40, 42 of the preferred embodiment extend axially from the hub portions 16, 18, it will be appreciated that the use of thick hub portions 16, 18 could mean that the rim portions 40, 42 are simply formed by outer edges of the hub portions 16, 18.

It will be understood that in an alternative embodiment the hub portions 16, 18 may be welded together rather than (or in addition to) bolting.

The invention claimed is:

1. A gate wheel having a central axis and at least two hub portions, each hub portion being connected to a respective rim portion, at least one hub portion including an opening, the opening passing through the central axis and extending to an outer periphery of the hub portion, and wherein the at least two hub portions form a substantially complete wheel.

2. A gate wheel as claimed in claim 1, wherein the rim portion extends through 180°.

3. A gate wheel as claimed in claim 1, wherein the at least one hub portion extends through an arc greater than 180°.

4. A gate wheel as claimed in claim 1, wherein the gate wheel has two identical hub portions.

5. A gate wheel as claimed in claim 1, wherein the gate wheel includes a tubular axle formed in two axle portions.

6. A gate wheel as claimed in claim 5, wherein each axle portion has a radial extension arranged, in use, to locate against a hub portion and be fixed to the hub portion.

7. A gate wheel as claimed in claim 6, wherein each radial extension includes at least one primary fixing means arranged to fix the radial extension to the hub portions.

8. A gate wheel as claimed in claim 7, wherein the gate wheel includes secondary fixing means arranged to connect one hub portion to another hub portion such that the respective rim portions combine to form a substantially complete wheel rim.

9. A gate wheel as claimed in claim 5, wherein the tubular axle is arranged to rotate about a gate frame.

10. A method of attaching a gate wheel to a gate frame, the gate frame defining a gate, the method including the steps of:
    (a) locating an upper axle portion about the gate frame;
    (b) locating a lower axle portion about the gate frame;
    (c) inserting a first hub portion from a first side of the gate; the first hub portion having an opening within which the gate frame can be received; the first hub portion having a first rim portion;
    (d) inserting a second hub portion from a second side of the gate; the second hub portion having an opening within which the gate frame can be received; the second hub portion having a second rim portion;
    (e) fixing the first hub portion to the second hub portion such that the first and second rim portions combine to form a substantially complete wheel rim;
    (f) fixing a radial extension of the upper axle portion to the first and second hub portions; and
    (g) fixing a radial extension of the lower axle portion to the first and second hub portions, such that the relative position of the upper and lower axle portions are fixed and the upper and lower axle portions create an axle arranged to rotate about the gate frame.

11. A gate wheel as claimed in claim 2, wherein the at least one hub portion extends through an arc greater than 180°.

12. A gate wheel as claimed in claim 3, wherein the gate wheel has two identical hub portions.

13. A gate wheel having at least a first hub portion and a second hub portion, each hub portion being connected to a respective rim portion, each hub portion having an axle receiving portion, the gate wheel being moveable between a first configuration whereby the first hub portion and the second hub portion can be independently moved relative to an axle supporting the gate wheel, and a second configuration whereby the first hub portion is connected to the second hub portion such that the respective rim portions combine to form a substantially complete wheel rim.

14. A gate wheel as claimed in claim 13, wherein each rim portion extends through 180°.

15. A gate wheel as claimed in claim 13, wherein the gate wheel has two identical hub portions.

16. A gate wheel as claimed in claim 13, wherein the gate wheel has a tubular axle formed in two axle portions.

17. A gate wheel as claimed in claim 16, wherein each axle portion has a radial extension arranged, in use, to locate against a hub portion and be fixed to the hub portion.

18. A gate wheel as claimed in claim 17, wherein each radial extension includes at least one primary fixing means arranged to fix the radial extension to both hub portions.

19. A gate wheel as claimed in claim 18, wherein the tubular axle is arranged to rotate about a gate frame.

20. A gate wheel as claimed in claim 13, wherein the gate wheel includes fixing means arranged to connect one hub portion to another hub portion.

* * * * *